United States Patent
Wang

(10) Patent No.: US 7,380,625 B2
(45) Date of Patent: Jun. 3, 2008

(54) VEHICLE ENGINE COMPARTMENT HOOD

(75) Inventor: Jenne-Tai Wang, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/532,939

(22) Filed: Sep. 19, 2006

(65) Prior Publication Data

US 2007/0062749 A1    Mar. 22, 2007

Related U.S. Application Data

(60) Provisional application No. 60/718,710, filed on Sep. 20, 2005.

(51) Int. Cl.
*B62D 25/10* (2006.01)
(52) U.S. Cl. .............. 180/69.21; 180/69.2; 180/69.24; 180/274
(58) Field of Classification Search ............... 180/69.2, 180/69.21, 69.24, 274
See application file for complete search history.

(56) References Cited

U.S. PATENT DOCUMENTS

| | | | | |
|---|---|---|---|---|
| 5,197,560 A | * | 3/1993 | Oda et al. ................ | 180/69.21 |
| 6,237,992 B1 | * | 5/2001 | Howard ................. | 296/187.04 |
| 6,345,679 B1 | * | 2/2002 | Sasaki ......................... | 180/274 |
| 6,439,330 B1 | * | 8/2002 | Paye ....................... | 180/69.21 |
| 6,588,526 B1 | * | 7/2003 | Polz et al. ............... | 180/69.21 |
| 6,802,556 B2 | * | 10/2004 | Mattsson et al. ...... | 296/187.09 |
| 6,953,220 B2 | * | 10/2005 | Takehara ............... | 296/187.04 |
| 7,143,856 B2 | * | 12/2006 | Takahashi et al. .......... | 180/274 |
| 7,207,406 B1 | * | 4/2007 | Polz et al. ............... | 180/69.21 |
| 2002/0014367 A1 | * | 2/2002 | Sasaki et al. ............... | 180/274 |
| 2002/0170759 A1 | * | 11/2002 | Son ......................... | 180/69.21 |
| 2003/0121710 A1 | * | 7/2003 | Hamada et al. ............. | 180/274 |
| 2005/0179286 A1 | * | 8/2005 | Adachi ................... | 296/193.11 |
| 2005/0257980 A1 | * | 11/2005 | Green et al. ................ | 180/274 |
| 2007/0039772 A1 | * | 2/2007 | Stuve ......................... | 180/274 |

\* cited by examiner

*Primary Examiner*—Christopher Ellis
*Assistant Examiner*—Katy Meyer

(57) ABSTRACT

A vehicle engine compartment hood is provided for a vehicle body having a hood opening. A hood panel normally closes the engine compartment. A hood base panel underlies the hood panel and is pivotally mounted on the vehicle body for pivotal opening movement to lift the hood panel and allow access to the engine compartment through the hood opening. A mechanism acts between the hood panel and the hood base panel for selectively elevating the hood panel above the hood base panel and the hood opening when the vehicle is in a pedestrian rich environment. The mechanism absorbs energy when an impact is received against the hood panel.

7 Claims, 5 Drawing Sheets

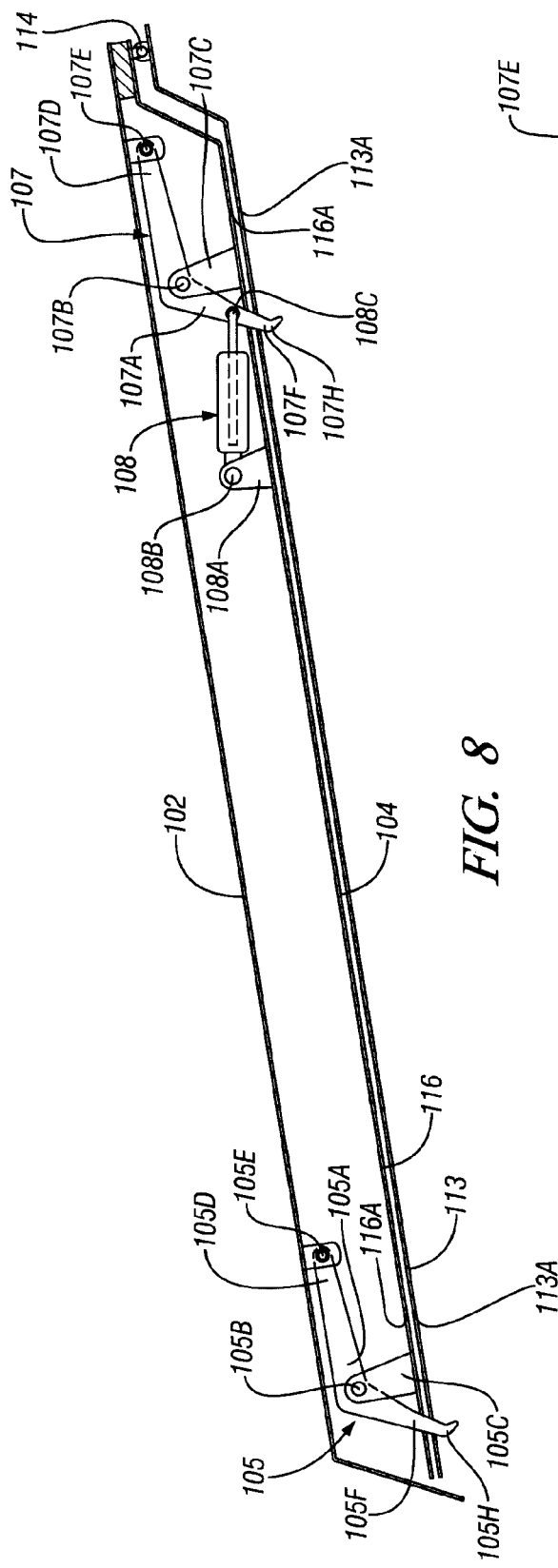
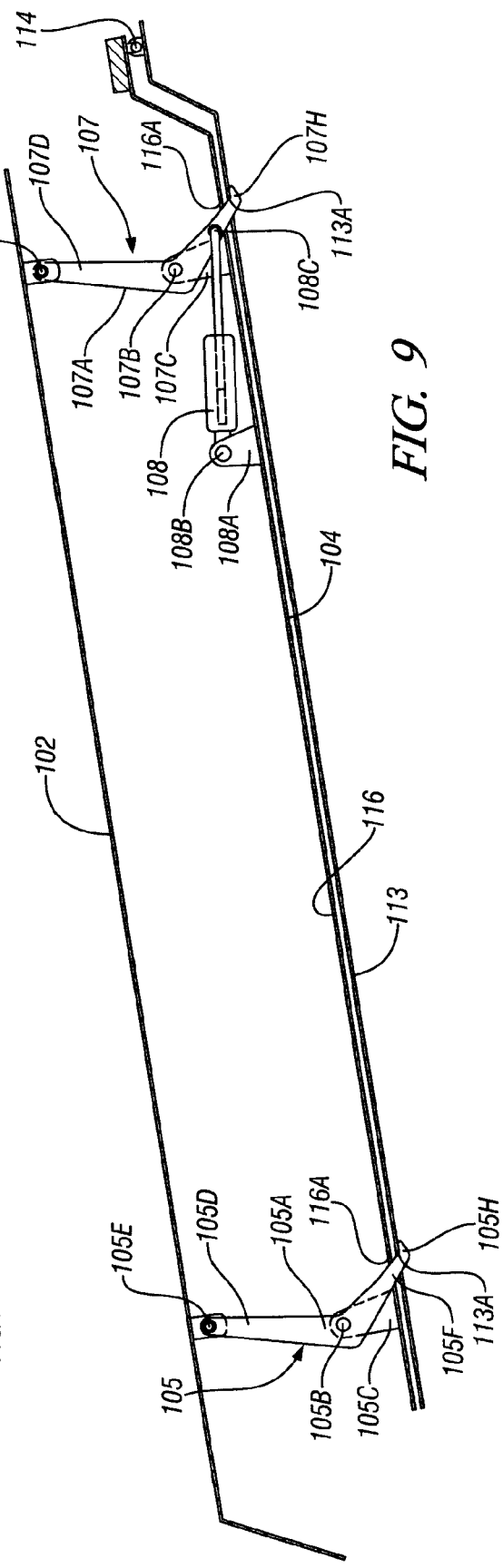
FIG. 8
FIG. 9

VEHICLE ENGINE COMPARTMENT HOOD

This application claims the benefit of U.S. Provisional Application No. 60/718,710, filed Sep. 20, 2005.

FIELD OF THE INVENTION

The present invention relates to an engine compartment hood for a motor vehicle.

BACKGROUND OF THE INVENTION

The prior art has recognized that it may be desirable for pedestrian safety when the front end of a motor vehicle is capable of absorbing impact energy.

It would be desirable to provide a vehicle engine compartment hood that actively offers energy absorption when the vehicle is driven in a pedestrian rich environment or operating in conditions of high probability for pedestrian and vehicle collision.

It should be understood that the detailed description and specific examples, while indicating exemplary embodiments of the invention, are intended for purposes of illustration only and are not intended to limit the scope of the invention.

SUMMARY OF THE INVENTION

A vehicle engine compartment hood is provided for a vehicle body having a hood opening. A hood panel normally closes the engine compartment. A hood base panel underlies the hood panel and is pivotally mounted on the vehicle body for pivotal opening movement to lift the hood panel and allow access to the engine compartment through the hood opening. A mechanism acts between the hood panel and the hood base panel for selectively elevating the hood panel above the hood base panel and the hood opening when the vehicle is in a pedestrian rich environment. The mechanism absorbs energy when an impact is received against the hood panel.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a view similar to FIG. 2 but showing another embodiment of the invention; and, FIG. 9 is a view showing the embodiment of FIG. 8 elevated by an actuator and linkage mechanism.

DETAILED DESCRIPTION OF THE EXEMPLARY EMBODIMENTS

The following description of exemplary embodiments is merely exemplary in nature and is in not intended to limit the invention, its application, or uses.

Figure 1:
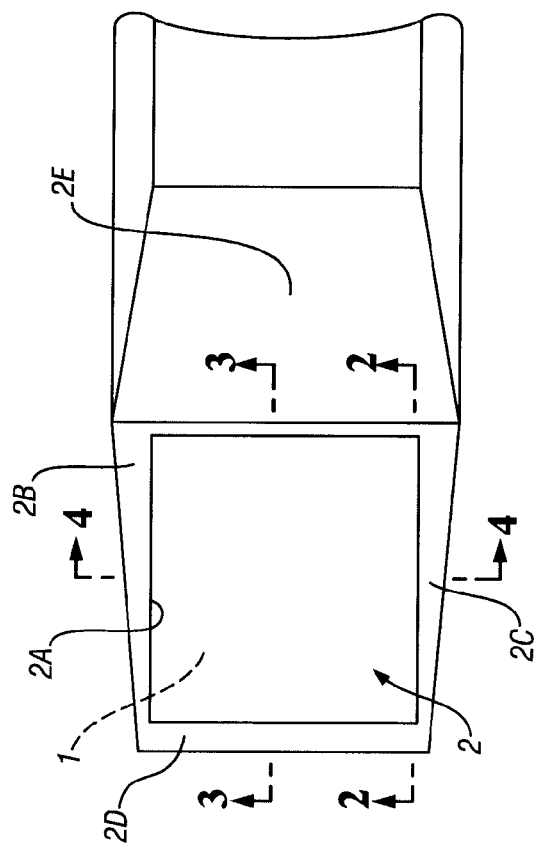
FIG. 1 is a top view of the front end of a vehicle, showing an engine compartment hood.

Referring to FIG. 1, a vehicle body includes an engine compartment 1 that is closed by engine compartment hood 2 that is mounted in a hood opening 2A defined between right fender 2B and left fender 2C at the side of the vehicle body, a header 2D at the front, and a windshield 2E at the rear. The right and left fenders have fender flanges 13, as best seen in FIG. 4.

Figure 2:
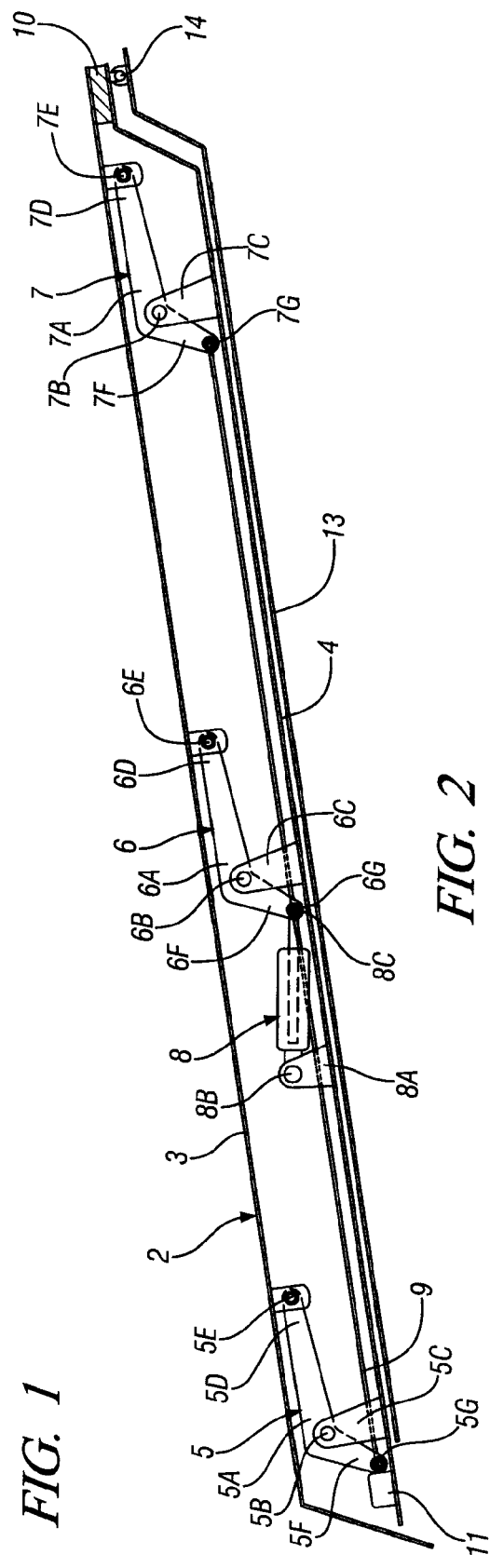
FIG. 2 is a section view taken in the direction of arrows 2-2 of FIG. 1.
Figure 3:
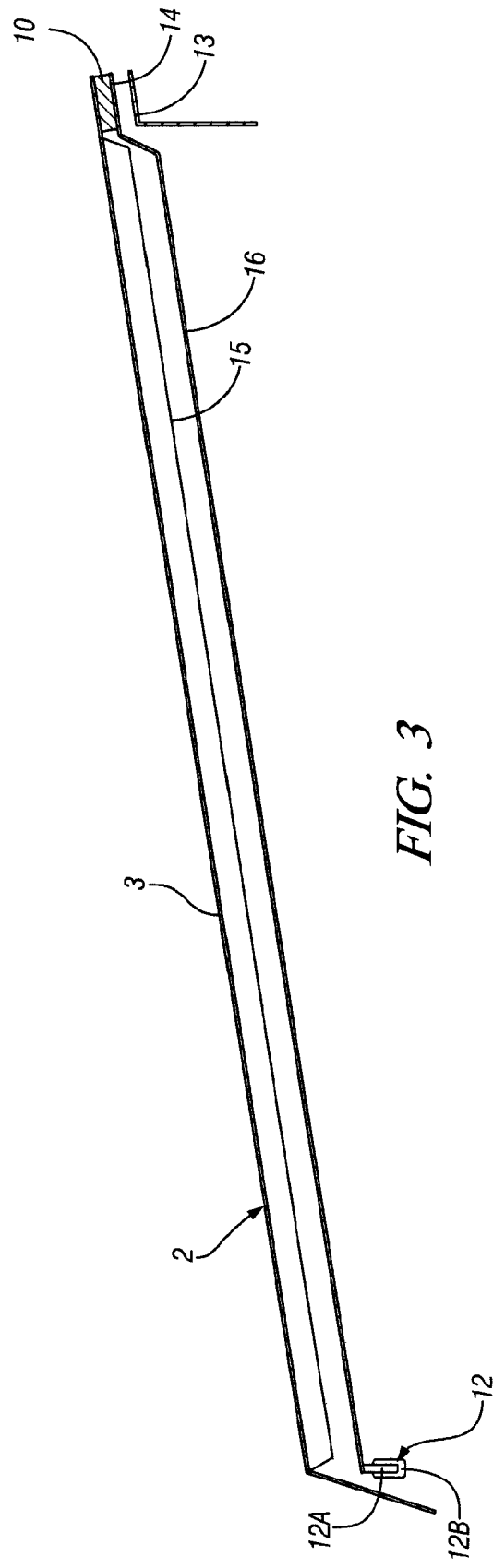
FIG. 3 is a section view taken in the direction of arrows 3-3 of FIG. 1.

As seen in FIGS. 2 and 3, the hood 2 includes a hood outer panel 3 and a hood inner reinforcement panel 15 that are attached together by a flange around their peripheral edges to form the one-piece hood 2. A hood base panel 16, best seen in FIG. 4, underlies the outer panel 3 and the reinforcement 15 of the hood 2. A linkage mechanism, to be described hereinafter is provided between the hood 2 and the hood base panel 16. As seen in FIG. 4, the hood base panel 16 has flanges 4 along its edges that overlie the fender flanges 13 of the fenders 2B and 2C.

Figure 5:
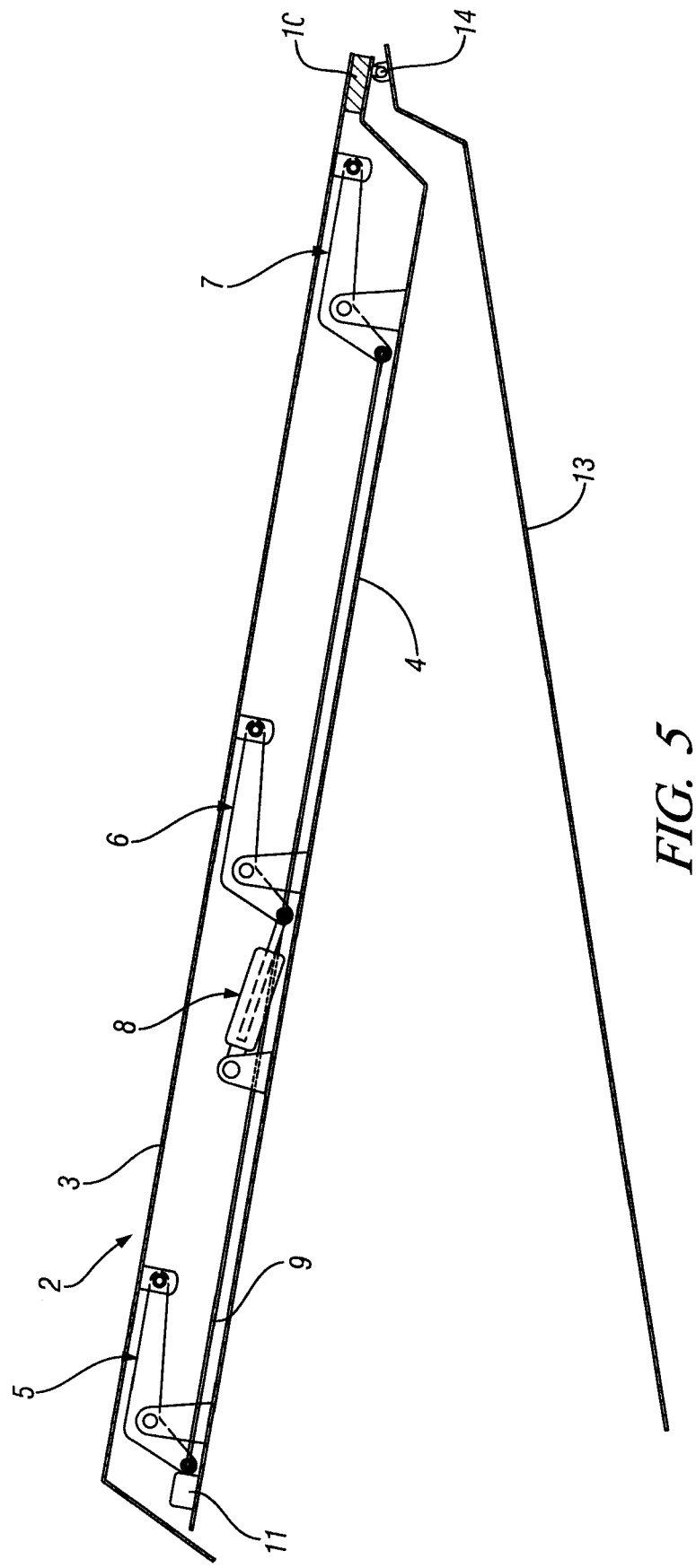
FIG. 5 is a view similar to FIG. 2 but showing the hood unlatched and pivoted open to permit access to the vehicle engine compartment.

As seen in FIGS. 2 and 5, hood hinges 14 are provided to pivotally mount the rear end corners of the hood base panel 16 on the fender flanges 13. A latch assembly 12, including a striker 12A and a latch 12B are provided at the front of the hood 2. The striker 12A, best seen in FIG. 3, engages with the latch 12B mounted on the header 2D at the front of the hood opening 2A to normally latch the hood 2 in a closed position. However, the striker 12A can be unlatched from the latch 12B to permit the hood 2 to be pivoted upwardly away from the fenders to the position of FIG. 5 for access to the engine compartment 1.

Figure 4:
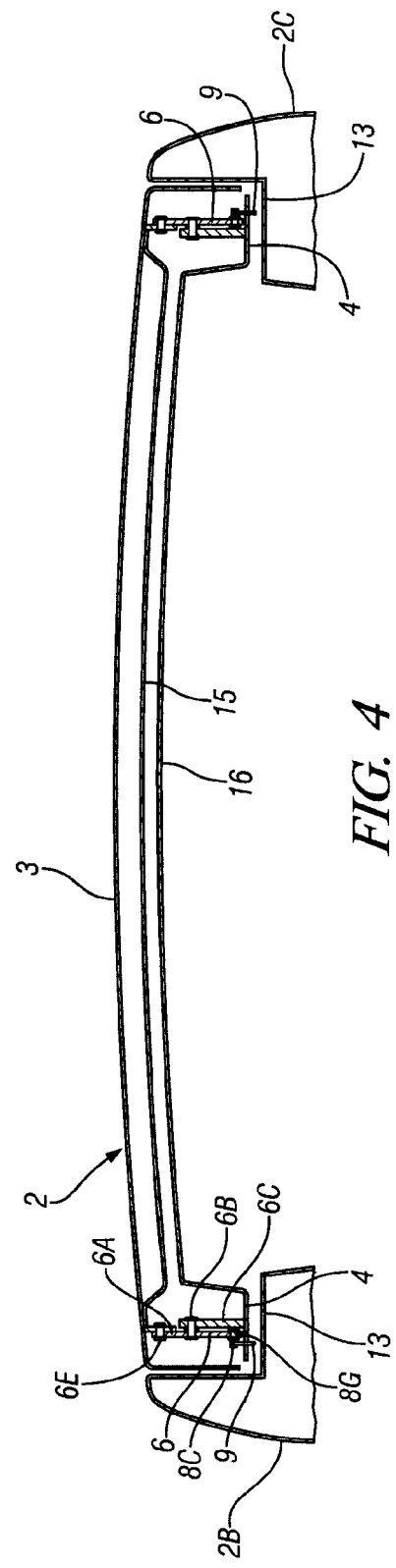
FIG. 4 is a section view taken in the direction of arrows 4-4 of FIG. 1.

Referring now to FIGS. 2 and 4, it is seen that the linkage mechanism acting between the hood 2 and the flanges 4 of the hood base panel 16 includes a front link 5, a middle link 6 and a rear link 7.

Front link 5 has a center portion 5A that is pivotally mounted by a pivot 5B to stanchion 5C that is attached to the flange 4 of the hood base panel 16. Link 5 also has an upper end 5D that is pivotally mounted to the hood 2 by a pivot 5E. And link 5 has a lower end 5F that is pivotally mounted to the connecting rod 9 by a pivot 5G.

Middle link 6 has a center portion 6A that is pivotally mounted by a pivot 6B to stanchion 6C that is attached to the flange 4 of the hood base panel 16. Link 6 also has an upper end 6D that is pivotally mounted to the hood 2 by a pivot 6E. And link 6 has a lower end 6F that is pivotally mounted to the connecting rod 9 by a pivot 6G.

Rear link 7 has a center portion 7A that is pivotally mounted by a pivot 7B to stanchion 7C that is attached to the flange 4 of the hood base panel 16. Link 7 also has an upper end 7D that is pivotally mounted to the hood 2 by a pivot 7E. And link 7 has a lower end 7F that is pivotally mounted to the connecting rod 9 by a pivot 7G.

Thus each of these links 5, 6 and 7 has a lower end that is pivotally connected to the connecting rod 9 so that the links are linked together and caused to pivot in unison about their respective pivot points. It will be appreciated that one of these linkage mechanisms is provided at each side of the hood 2.

An actuator 8 has one end pivotally connected to the flange 4 of the hood base panel by stanchion 8A and pivot 8B. Actuator 8 also has a second end that is pivotally connected to the lower end 6F of the middle link 6 and/or the connecting rod 9, by a pivot 8C.

As seen in FIGS. 2 and 4, the actuator 8 and the linkage mechanism, including the links 5, 6, and 7 and the rod 9, cooperate to establish the hood 2 in a normal position in which the hood 2 fits flush within the hood opening 2A of the vehicle body.

However, upon energization of the actuator 8, the actuator 8 and the links 5, 6, and 7 act as an elevator mechanism to elevate the hood 2. In particular, the actuator 8 is extended in length and pushes on the connecting rod 9 to cause the links 5, 6, and 7 to pivot from their retracted positions of FIGS. 2 and 4 to an elevated position shown in FIGS. 6 and 7 so that the hood 2 is elevated a few inches above the hood opening. When the actuator 8 is reversed, the actuator 8 will contract in length and pull the connecting rod 9 to cause the links 5, 6 and 7 to pivot down and return the hood 2 to the normal condition of FIGS. 2 and 4. The normal position of the hood 2 is established by a cushion 10 mounted on the rear edge of the base panel 16. The rear end of the hood 2 comes to rest upon the cushion 10. In addition a stop 11 is provided at the front of the base panel 16 and the lower end 5F of the front link 5 and/or the connecting rod 9 comes to rest upon the stop 11.

One example of the actuator 8 is shown in U.S. Pat. No. 6,302,458. In this actuator, a tube is powered out to an extended position, or retracted to a retracted position by an electric motor. The actuator also includes a lock to lock the tube in the extended position, as well as an energy absorbing device that will allow forced retraction of the tube in the event that a certain level of force is exerted against the actuator in the retracting direction. The electric motor is connected with sensors and controllers and functions according to an algorithm that is designed for the particular application of the actuator.

OPERATION

In the present invention, the vehicle is equipped with pedestrian sensors such as radar or vision sensor or infrared sensor or laser sensor, or a contact sensor. The vehicle also has conventional speed sensors and steering sensors and braking sensors and other sensors that gather information relating to the operation of the motor vehicle. A controller processes information from these sensors, as well as perhaps manual controls operated by the driver, and energizes the actuator 8 to elevate the hood 2 when the an algorithm determines that the vehicle is being driven in a pedestrian environment.

Figure 6:
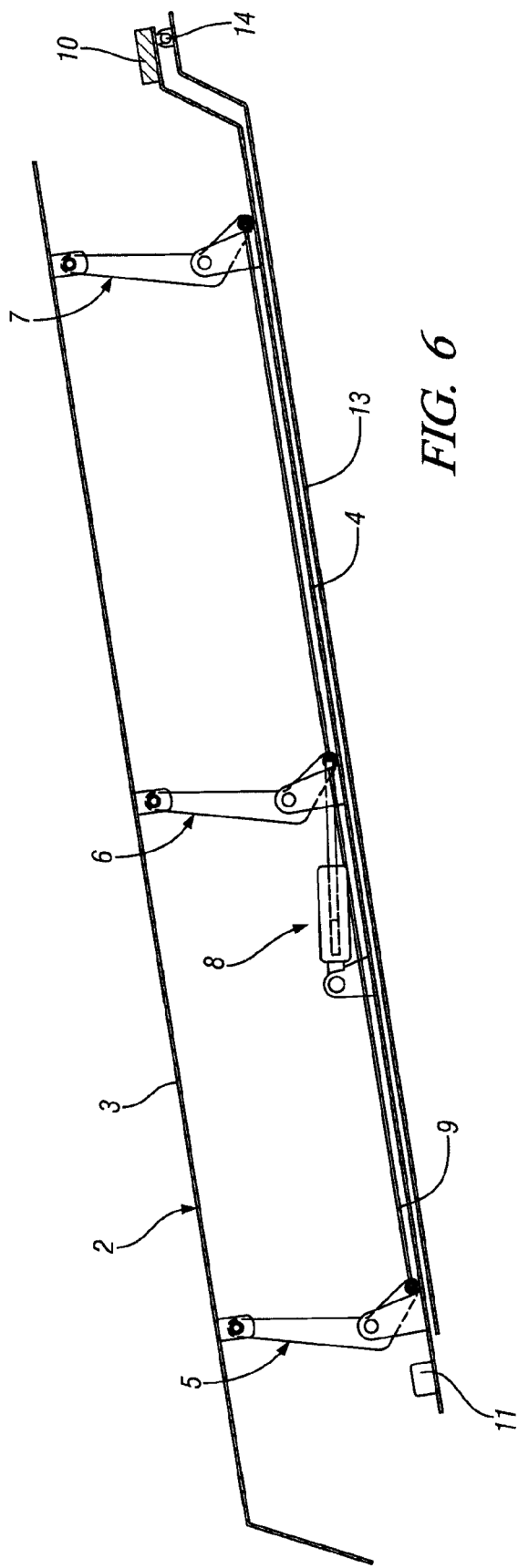
FIG. 6 is a view similar to FIG. 2 but showing the hood elevated by an actuator and linkage mechanism.
Figure 7:
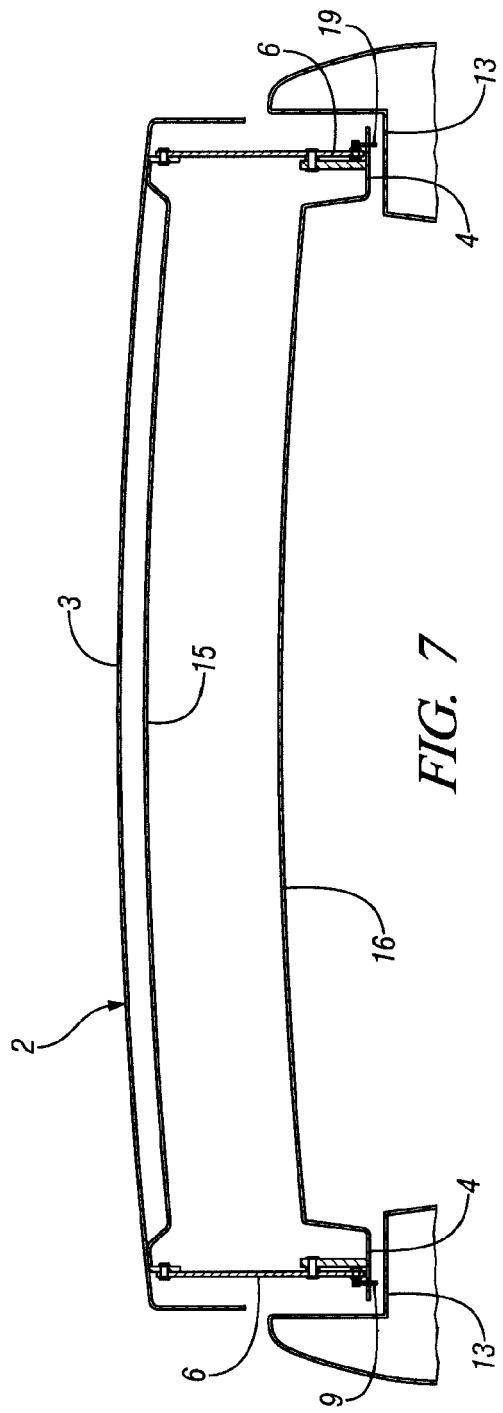
FIG. 7 is a view similar to FIG. 4 but showing the hood elevated by the actuator and linkage mechanism.

In operation, during normal highway operation of the vehicle, the hood outer panel 3 will be retracted to its normal position within the hood opening 2A. But when the controller determines that the vehicle has entered a pedestrian environment, the actuator 8 and the linkage mechanism will activate to elevate the hood outer panel 3 to the elevated position of FIGS. 6 and 7. As seen in FIGS. 6 and 7, whenever the hood outer panel 3 is elevated, the hood base panel 16 remains at its position of FIGS. 2 and 3 so that access to the engine compartment remains closed by the hood base panel 16.

When the vehicle leaves the pedestrian environment, the hood outer panel 3 is again lowered to its normal position of FIGS. 1 and 2.

In the event that an impact is imposed upon the hood 2 while it is elevated, the hood outer panel 3 can collapse in a controlled manner via the energy absorbing retraction of the actuator 8. Or energy can be absorbed by flexure or deformation of the links 5, 6, and 7 and/or deformation of the hood 2. Thus the hood 2 yields to the imposed force and absorbs energy in a controlled manner.

In the event that the engine compartment needs to be accessed in order to service the engine, the latch 12B is released to release the striker 12A so that the hood 2 and the hood base panel 16 can be pivoted upwardly about the hinges 14, as seen in FIG. 5.

Another embodiment of the invention is shown in FIGS. 8 and 9. A hood base panel 116 underlies hood 102. The hood base panel 116 has flanges 104 along its edges that overlie the fender flanges 113 of the fenders. A linkage mechanism, to be described hereinafter, is provided between the hood 102 and the flange 104 of hood base panel 116. Hood hinge 114 pivotally mounts the rear end corners of the hood base panel 116 on the fender flanges 113 or other vehicle body structure.

The linkage mechanism acting between the hood 102 and the flanges 104 of the hood base panel 116 includes a front link 105 and a rear link 107.

Front link 105 has a center portion 105A that is pivotally mounted by a pivot 105B to stanchion 105C that is attached to the flange 104 of the hood base panel 116. Link 105 also has an upper end 105D that is pivotally mounted to the hood 102 by a pivot 105E. And link 105 has a lower end 105F that forms a hook 105H that reaches into a slot 116A provided in the flange 104 of the hood base panel 116 and a slot 113A provided in the fender flange 113.

Rear link 107 has a center portion 107A that is pivotally mounted by a pivot 107B to stanchion 107C that is attached to the flange 104 of the hood base panel 116. Rear link 107 also has an upper end 107D that is pivotally mounted to the hood 102 by a pivot 107E. And link 107 has a lower end 107F that forms a hook 107H that reaches into a slot 116A provided in the flange 104 of the hood base panel 116 and a slot 113A provided in the fender flange 113.

An actuator 108 has one end pivotally connected to the flange 104 of the hood base panel 116 by stanchion 108A and pivot 108B. Actuator 108 also has a second end that is pivotally connected to the lower end 107F of the rear link 107 by a pivot 108C.

As seen in 8, the actuator 108 and the linkage mechanism, including the links 105 and 107 cooperate to establish the hood 102 in a normal position in which the hood 102 fits flush within the hood opening of the vehicle body. In the event that an impact force against the front of the hood were to attempt rearward excursion of the hood 102, the hooks 105H and 107H will engage against the wall of the slots 113A in the fender flanges 104 to restrain the hood 102 and the hood base panel 116 against such rearward excursion.

Upon energization of the actuator 108, the actuator 108 and the links 105 and 107 act as an elevator mechanism to elevate the hood 102 to the position of FIG. 9. In the event that an impact is imposed upon the hood 102 while it is elevated, the hood 102 can collapse in a controlled manner via the energy absorbing retraction of the actuator 8. Or energy can be absorbed by flexure or deformation of the links 105 and 106 and/or deformation of the hood 102. However, if the impact load also attempts to move the hood base panel 116 rearwardly toward the windshield, the hooks 105H and 107H will engage against the wall of the slots 113A in the fender flanges 104 so that the links restrain the hood 102 and the hood base panel 116 against such rearward excursion.

In the event that the engine compartment needs to be accessed in order to service the engine, the hood 102 is unlatched so that the hood 102 and the hood base panel 106 can be pivoted upwardly about the hinges 114, as permitted by the hook portions 105H and 107H being pivoted upwardly with the hood base panel 116 and being withdrawn from the slots 113A in the fender flanges 104.

It will be understood that the foregoing description of the invention is merely exemplary in nature and, thus, variations thereof are intended to be within the scope of the invention. For example, the actuator 8 may be of various mechanical, hydraulic or pneumatic designs. Or the linkage mechanism can be replaced by hydraulic or pneumatic cylinder or by inflatable air bags or a pyrotechnic actuator. The actuator may be connected to any of the links, or to a connecting rod. The extent to which the hood 2 will be elevated is determined by the length of the links 5, 6, and 7. All of the links can be of the same length so that the front and rear will be elevated the same distance, as shown in the drawings. Or, for example, the front link 5 can be 2 inches, the middle link 6 can be 4 inches and the rear link 7 can be 6 inches, so that the hood 2 will be higher at the rear than at the front. Alternatively, the front link can be replaced by a simple front pivot so that the hood elevates by links at the rear of the hood for pivoting the hood about the front pivot.

It will be appreciated that in FIGS. 6 and 7, showing the hood 2 elevated, the hood base panel 16 remains in place to cover the engine compartment. However, it may be desirable to lighten the vehicle by having a hood base panel 16 that is a rectangular frame shape with side flanges 4 for mounting the links, but with a large central opening, in which case the engine compartment will be somewhat exposed to view when the hood 2 is elevated.

And, the hooks 105H and 107H can be employed on some or all or none of the links.

What is claimed is:

1. A vehicle engine compartment hood for a vehicle body having a hood opening bordered by fenders and through which an engine compartment is accessible, comprising:

a hood base panel pivotailly mounted on the vehicle body for pivotal movement between a closed position in which the hood base panel closes the hood opening and a raised position in which access to the engine compartment is available through the hood opening;

a hood panel located above the hood base panel and subject to loading by a pedestrian thereagainst;

an elevator mechanism mounting the hood panel on the hood base panel and normally establishing the hood panel flush with the fenders but actuatable to elevate the hood panel bodily above the fenders and the hood opening;

said elevator mechanism having a plurality of links on each side of the engine compartment hood, each link having an upper end pivoted to the hood panel and a lower end pivoted to the hood base panel, and at least one of the links on each side of the engine compartment hood having a hook portion; and a slot provided in both the fender and the hood base panel at each of the hook portions for receiving the hook portion to limit rearward excursion of the hood panel and the hood base panel.

2. The engine compartment hood of claim 1 in which the elevator mechanism has a front link pivotally connected to both the front of the hood panel and the front of the hood base panel, and a rear link pivotally connected to the rear of the hood panel and the rear of the hood base panel.

3. The engine compartment hood of claim 2 in which the links cooperate to elevate both the front and the rear of the hood panel to the same height above the fenders.

4. The engine compartment hood of claim 2 in which an intermediate link is located between the front link and the rear link and pivotally connected to hood panel and the hood base panel.

5. The engine compartment hood of claim 2 in which a connecting rod is pivotally connected to both the front link and the rear link and an actuator is energizable to elevate the hood panel via the front and rear links and the connecting rod.

6. The engine compartment hood of claim 5 in which some or all of the links and connecting rod and actuator may be deformed by a load imposed on the hood in order to absorb energy.

7. The engine compartment hood of claim 1 in which a latch mechanism acts between the vehicle body and the hood base panel to normally latch the hood base panel in the lowered position but may be released to permit pivoting of the hood base panel and the hood to the raised position permitting access to the engine compartment.

* * * * *